United States Patent
Frank et al.

(10) Patent No.: US 11,038,411 B2
(45) Date of Patent: Jun. 15, 2021

(54) SYSTEM HAVING AN ELECTRIC MACHINE WITH A CRYOGENIC COMPONENT, AND A METHOD FOR OPERATING THE SYSTEM

(71) Applicant: Rolls-Royce Deutschland Ltd & Co KG, Blankenfelde-Mahlow (DE)

(72) Inventors: Michael Frank, Uttenreuth (DE); Jörn Grundmann, Großenseebach (DE); Peter van Haßelt, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 54 days.

(21) Appl. No.: 16/320,679

(22) PCT Filed: Jun. 12, 2017

(86) PCT No.: PCT/EP2017/064219
§ 371 (c)(1),
(2) Date: Jan. 25, 2019

(87) PCT Pub. No.: WO2018/019461
PCT Pub. Date: Feb. 1, 2018

(65) Prior Publication Data
US 2019/0157964 A1    May 23, 2019

(30) Foreign Application Priority Data
Jul. 29, 2016  (DE) ..................... 10 2016 213 993.2

(51) Int. Cl.
*H02K 55/02*    (2006.01)
*H02K 9/10*    (2006.01)
(Continued)

(52) U.S. Cl.
CPC ............. *H02K 55/02* (2013.01); *B64D 27/24* (2013.01); *B64D 41/00* (2013.01);
(Continued)

(58) Field of Classification Search
CPC .......... H02K 55/02; H02K 55/00; H02K 9/10; H02K 9/20; B64D 27/24; B64D 41/00;
(Continued)

(56) References Cited

U.S. PATENT DOCUMENTS 6,076,360 A      6/2000  Viegas et al.
2012/0279682 A1  11/2012 Bonnet et al.

FOREIGN PATENT DOCUMENTS

AT    52882 B     5/1990
DE    2453182 A1  5/1976
(Continued)

OTHER PUBLICATIONS

Machine translation of JP-2006136071-A. (Year: 2006).*
(Continued)

*Primary Examiner* — Michael Andrews
(74) *Attorney, Agent, or Firm* — Lempia Summerfield Katz LLC

(57) ABSTRACT

The disclosure relates to a system having an electric machine with a superconductive component cooled using a cryogenic liquid, and in particular to the full utilization of the refrigeration power available from vaporization of the cryogenic coolant. The system also has a fuel cell, in which an operating medium may be reacted to provide electrical energy. The coolant is fed in liquid form to the superconductive component to cool the component, utilizing the vaporization enthalpy of the coolant. The coolant is then fed
(Continued)

in gaseous form to a further component of the machine to cool the component, utilizing the heating enthalpy of the coolant. The now heated coolant is fed to the fuel cell, which uses the coolant supplied to the fuel cell as an operating medium and reacts it.

17 Claims, 5 Drawing Sheets

(51) Int. Cl.
  *H02K 9/20* (2006.01)
  *B64D 27/24* (2006.01)
  *B64D 41/00* (2006.01)
  *H01M 8/04007* (2016.01)
  *H01M 8/04029* (2016.01)
(52) U.S. Cl.
  CPC ... *H01M 8/04007* (2013.01); *H01M 8/04029* (2013.01); *H02K 9/10* (2013.01); *H02K 9/20* (2013.01); *B64D 2041/005* (2013.01); *Y02E 40/60* (2013.01)
(58) Field of Classification Search
  CPC ............... Y02E 40/622; Y02E 40/625; H01M 8/04007; H01M 8/04029
  USPC .......................................................... 310/52
  See application file for complete search history.

(56) References Cited

FOREIGN PATENT DOCUMENTS

| | | | |
|---|---|---|---|
| DE | 69317860 T2 | 10/1998 | |
| DE | 102014208437 A1 | 11/2015 | |
| JP | 2004104925 A | * 4/2004 | ............. H02K 55/02 |
| JP | 2004104925 A | 4/2004 | |
| JP | 2005354809 A | * 12/2005 | |
| JP | 2005354809 A | 12/2005 | |
| JP | 2006136071 A | * 5/2006 | |
| JP | 2006136071 A | 5/2006 | |
| KR | 101154599 B1 | 6/2012 | |

OTHER PUBLICATIONS

Machine translation of JP-2005354809-A. (Year: 2005).*
Machine translation of JP-2004104925-A. (Year: 2004).*
German Office Action for German Application No. 10 2016 213 993.2 dated Mar. 8, 2017.
PCT International Search Report and Written Opinion of International Searching Authority dated Aug. 24, 2017 corresponding to PCT International Application No. PCT/EP2017/064219 filed Jun. 12, 2017.

* cited by examiner

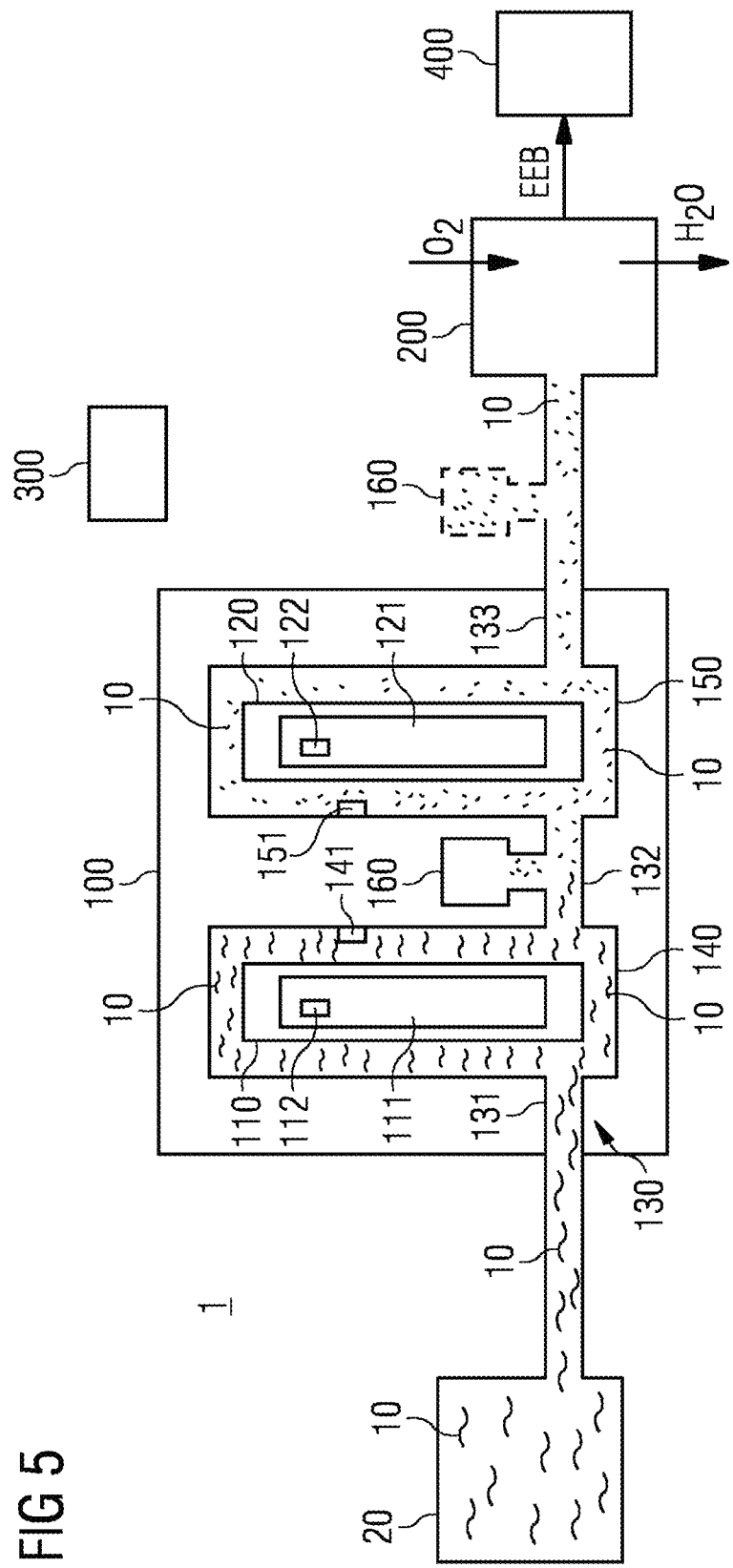

SYSTEM HAVING AN ELECTRIC MACHINE WITH A CRYOGENIC COMPONENT, AND A METHOD FOR OPERATING THE SYSTEM

The present patent document is a § 371 nationalization of PCT Application Ser. No. PCT/EP2017/064219, filed Jun. 12, 2017, designating the United States, which is hereby incorporated by reference, and this patent document also claims the benefit of German Patent Application No. DE 10 2016 213 993.2, filed Jul. 29, 2016, which is also hereby incorporated by reference.

TECHNICAL FIELD

The disclosure relates to an electric machine with a superconductive component which is cooled with the aid of a cryogenic liquid. In particular, the disclosure relates to the substantially complete use of the refrigerating capacity available from vaporization of the cryogenic liquid and the subsequent heating of the vaporized medium.

BACKGROUND

The operation of machines with cryogenic components, (e.g., components which are operated at cryogenic ambient temperatures), may require a not inconsiderable outlay for providing the cooling capacity which is needed to reduce the temperature of the components to a cryogenic level. There is potential for reducing the outlay if the machine is operated in an environment or in a system where operating medium is available which may be used to provide the required cooling capacity. Operating media of this type may be hydrogen and/or oxygen which are used, for example, onboard a submarine or an aircraft for operating consumers such as combustion turbines or fuel cells, and which, in order to save space, are carried along in the form of cryogenic liquids which are present at very low temperatures. For example, the boiling points of hydrogen and oxygen are approx. 20K and 90K, respectively.

Because the operating media are required by the consumers may be at temperatures of the order of magnitude of room temperature, they have to be first of all vaporized and heated prior to use. This takes place, for example, with the aid of electric heaters, but this has a negative effect on the overall efficiency of the system because of the energy consumed by the heater.

SUMMARY AND DESCRIPTION

It is therefore an object of the disclosure to improve the overall efficiency of a system of this type.

The scope of the present disclosure is defined solely by the appended claims and is not affected to any degree by the statements within this summary. The present embodiments may obviate one or more of the drawbacks or limitations in the related art.

In a method for operating a system which has a cryogenic, in particular superconductive, electric machine having a multiplicity of components, including at least one cryogenic component and at least one further component, and also a consumer which is designed to use an operating medium, a cryogenic coolant is supplied from a reservoir in a liquid state to the cryogenic component of the electric machine in order to cool the cryogenic component to a cryogenic temperature. The cryogenic component becomes superconducting at the cryogenic temperature or has a conductivity which is increased by at least one order of magnitude in relation to its conductivity at 0° C. During the cooling of the cryogenic component, the coolant at least partially vaporizes. The coolant is subsequently supplied in a liquid and/or gaseous state to the further component of the electric machine in order to cool down the further component using a cooling capacity of the coolant remaining after the cooling of the cryogenic component.

Subsequently, (e.g., after passing through the electric machine), the coolant is provided to the consumer by the electric machine, wherein the consumer uses and puts into effect the coolant, which is supplied thereto, as an operating medium.

The wording "in a liquid and/or gaseous state" is intended here to express the fact that the coolant, when it is conducted to the further component, may be entirely liquid, entirely gaseous, or else liquid in parts and gaseous in further parts.

The cryogenic component is cooled using at least a portion of the vaporization enthalpy of the liquid coolant. The further component may be cooled down optionally using a portion of the vaporization enthalpy remaining after the cooling of the cryogenic component. In particular, however, the further component is cooled down using at least a portion of the heating enthalpy of the coolant.

The concept underlying the disclosure is based on the fact that an electric machine with at least one cryogenic or superconductive component is operated in the system. This component may be a transformer, a flow limiter, a motor, or a generator. In this configuration of the system, the vaporization enthalpy of the cryogenic liquid coolant used for cooling the cryogenic component may be used in order to keep the component at an at least approximately constant operating temperature. In addition, use is now made of the fact that a considerable cooling potential is still contained in the heating enthalpy of the vaporized coolant. It is true that the corresponding cooling capacity, unlike that of the vaporization enthalpy, does not occur at a constant temperature, but rather over the complete range between the boiling point of the coolant and the subsequent use temperature at the consumer. Use of the heating enthalpy for cooling the cryogenic component which is operated at a constant low temperature is therefore only conditionally efficient. However, the heating enthalpy may be used for cooling the further component of the machine. In addition, a portion of the vaporization enthalpy possibly remaining after the cooling of the cryogenic component may optionally also be used for cooling the further component.

The further component is cooled down here to an extent such that not only is heating of the further component because of losses which occur during the regular operation of the further component compensated for or the corresponding heat is removed, but the further component is cooled down to an operating temperature at a temperature level lying below the normal temperature. The normal temperature refers to the temperature which the further components would have if the system or the electric machine is not in operation. For example, the normal temperature is the ambient or room temperature of the surroundings in which the electric machine is located. Conversely, the starting point for the definition of the normal temperature is that, as soon as the electric machine is operated, the further component has a temperature which lies above the normal temperature if it is not cooled down as described above/below.

Accordingly, the heating enthalpy and optionally a remaining portion of the vaporization enthalpy is used for cooling the further component. However, not only are the operationally induced losses of the further component intended to be removed here, but use is intended to be made of the effect that the electrical resistance of the further component decreases as the temperature drops and therefore so do, for example, the $I^2 \cdot R$ losses. The starting point here may be the fact that not only are the operationally induced losses removed here by the coolant, but additionally also the further component is cooled to a lower temperature level, and therefore the magnitude of the operationally induced losses is reduced, which, in turn, facilitates the cooling.

The coolant is only removed from the electric machine when a temperature of the coolant has exceeded a first predetermined minimum value, and/or is only supplied to the consumer when a temperature of the coolant has exceeded a second predetermined minimum value.

Although the first and second minimum values may be identical, the first minimum value may be predetermined in such a manner that the coolant is removed as soon as its temperature is so high, and therefore its cooling effect so low, that further cooling of the further component is no longer provided. The second minimum value may be so high that the temperature of the coolant or of the operating medium for the consumer lies in the range optimum for the operation of the consumer.

In an advantageous manner, the operating medium may additionally be supplied to the consumer, for example, when the operating medium provided to the consumer according to the method described up to now cannot cover the current requirement of the consumer for operating medium. In order to provide the additional operating medium, additional coolant is removed from the reservoir. The additional coolant removed is supplied to a bypass, which includes a mechanism of circumventing the cryogenic component, e.g., the coolant supplied to the bypass is not supplied to the cryogenic component. The bypass has a heating device to which the additional coolant removed is supplied and which heats the coolant supplied thereto to a temperature suitable for further use in the consumer. The heated coolant is provided as additional operating medium to the consumer. It is therefore possible to supply additional operating medium to the consumer via the bypass, for example, if the consumer has an increased requirement.

Excess coolant, (e.g., coolant currently not required or not able to be put into effect in the consumer and which is vaporized in the cryogenic component), may also be supplied to a store and temporarily stored there. At least in the event that a requirement of the consumer for operating medium exceeds an amount of operating medium provided by the electric machine, at least a portion of the coolant temporarily stored in the store is supplied as an additional operating medium to the consumer. The amount provided substantially corresponds here to the amount of liquid and/or gaseous coolant currently provided by the cryogenic component.

In an advantageous manner, the further component is cooled down before the electric machine is put into operation. This operating mode is advantageous, for example, and in particular in the event of use of the system in an aircraft having an electric drive system, because the further component, (for example, a stator winding of the electric machine), is thereby as cold as possible immediately before the starting of the electric aircraft, and therefore an overloading of the electric machine is briefly made possible, (for example, for the starting of the aircraft). In this example, putting the electric machine into operation is associated with activating the drive system of the aircraft for generating thrust.

A corresponding system has a cryogenic, (e.g., superconductive), electric machine having a multiplicity of components and having a conduction system for conducting a coolant to and between the components, and also a consumer which is designed to put an operating medium into effect, (for example, in order to provide electrical or mechanical energy). The multiplicity of components includes at least one cryogenic component, a first cooling system assigned to the cryogenic component, at least one further component, and a second cooling system assigned to the further component. The coolant may be supplied to the first cooling system from a reservoir in a liquid state via a first portion of the conduction system in order to cool the cryogenic component, using at least a portion of the vaporization enthalpy of the liquid coolant, to a cryogenic temperature, wherein the cryogenic component becomes superconducting at the cryogenic temperature or has a conductivity which is increased by at least one order of magnitude in relation to its conductivity at 0° C. The coolant may be supplied to the second cooling system by the cryogenic component or by the first cooling system via a further portion of the conduction system in order to cool down the further component, using a cooling capacity of the coolant remaining after the cooling of the cryogenic component and using at least a portion of the heating enthalpy of the coolant, to an operating temperature which is reduced in relation to a normal temperature. The operating medium of the consumer is in particular the coolant, and the consumer and the electric machine are connected fluidically to each other in such a manner that the coolant after passing through the electric machine may be supplied to the consumer in the gaseous state in order to be put into effect there.

The cryogenic component may be a rotor of the electric machine, (in particular, a cryogenic rotor winding of the rotor), or a superconducting permanent magnet arranged on the rotor.

In order to cool the rotor, the latter may be arranged in or at a bath having the liquid coolant.

The further component of the system may be a normally conducting component, for example, a stator of the electric machine such as a stator winding.

The consumer may be a fuel cell in which the operating medium is put into effect in order to provide electrical energy, or an internal combustion engine in which the operating medium is put into effect in order to provide kinetic energy.

The system has a reservoir for storing and providing the coolant in a liquid state, wherein the reservoir is fluidically or thermally connected to the electric machine in such a manner that the coolant may be supplied to the first portion of the conduction system and, via the portion, to the first cooling system and to the cryogenic component.

In addition, a bypass may be provided which connects the reservoir and the consumer fluidically to each other with the cryogenic component and the first cooling system being circumvented, and therefore a coolant which is supplied to the bypass from the reservoir may be directly or indirectly supplied as additional operating medium to the consumer via the bypass without the coolant being supplied in the bypass on the way to the consumer of the cryogenic component. "Directly or indirectly" means here that the bypass may be connected to the consumer directly and without interconnected essential further components. Secondly, in the event of the indirect connection, the coolant (after passing through the bypass and before reaching the consumer) may pass through other components, for example, the second cooling system. In no case, however, will the coolant passing through the bypass pass through the first cooling system.

The bypass has a heating device with which the coolant supplied to the bypass may be heated before the coolant is supplied to the consumer. With this device, a sufficient amount of operating medium may be supplied to the consumer, wherein the operating medium furthermore has a suitable temperature.

In one variant, the bypass also fluidically connects the reservoir and the consumer with the further component and the second cooling system being circumvented. At least in this variant, the heating device has, for example, electric heating.

In an alternative variant, the bypass connects the reservoir and the second cooling system for cooling the further component fluidically to each other, and therefore the coolant supplied to the bypass, after passing through the bypass, may be supplied as an additional operating medium to the second cooling system and to the further component and subsequently to the consumer. In this variant, the heating device may be a separate device for heating the coolant, (for example, electric heating), or else the second cooling system constitutes the heating device, and therefore a separate apparatus for heating the coolant before the latter is supplied to the consumer may be omitted.

The system may have a store to which at least excess coolant, e.g., coolant which is currently not required or cannot be put into effect in the consumer and is vaporized in the cryogenic component may be supplied and may be temporarily stored there. Alternatively or additionally to the above-described bypass, this store constitutes a possibility of always supplying the consumer with a sufficient amount of operating medium.

Here and below, the term cryogenic electric machine means that at least one component of the machine, (for example, a permanent magnet or a rotor winding or stator winding of the machine), is cryogenically cooled and accordingly is at a cryogenic temperature, (e.g., an extremely low temperature), at which the conductivity is significantly improved in relation to same at room temperature. In an analogous manner, for example, the term cryogenic component may also be understood as meaning that the component is cryogenically cooled.

For example, it is conceivable to produce the cryogenic component from copper or aluminum and to cool the component to a temperature of 21 K. Although these metals are not yet superconducting at this temperature, their resistance drops by up to three orders of magnitude in relation to the resistance at room temperature, which already constitutes a great advantage.

In the case of the cryogenic component of the electric machine, the cryogenic cooling may be undertaken to such an extent that the cooled component transfers into a superconducting state. For this purpose, this component is composed of a material which merges into the superconducting state upon falling below the transition temperature for this material. Accordingly, the term superconducting electric machine means that at least one component of the generator, (for example, the solenoid again), is superconducting or is composed of a material which merges into the superconducting state upon falling short of the transition temperature for this material. In an analogous manner, the term superconducting component may also be understood as meaning that this component is composed of a material which merges into the superconducting state upon falling short of the transition temperature for this material.

BRIEF DESCRIPTION OF THE DRAWINGS

The disclosure and exemplary embodiments will be explained in more detail below with reference to drawings, in which:

FIG. 5 depicts a third embodiment of the system.

DETAILED DESCRIPTION

Figure 1:
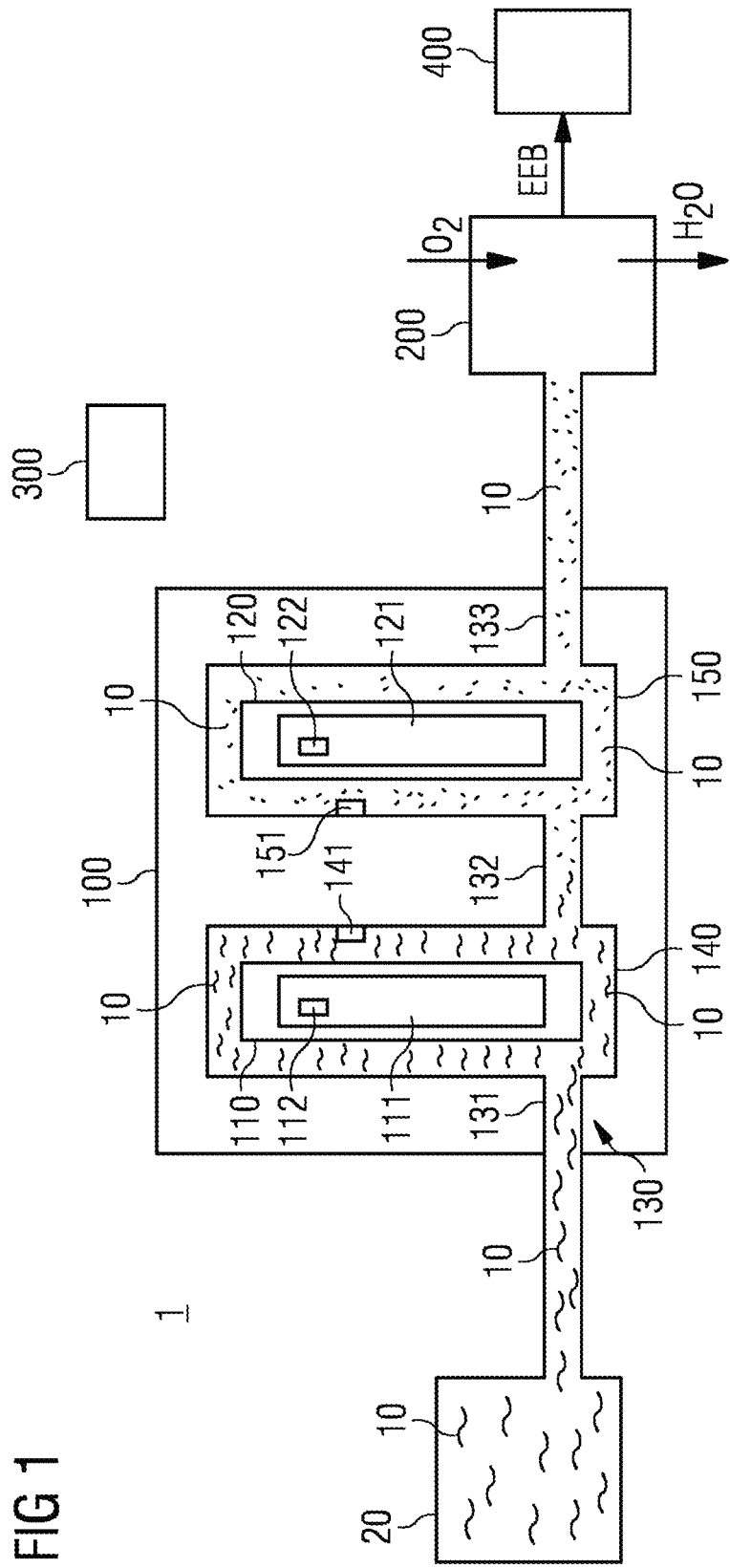
FIG. 1 depicts a first embodiment of a system with an electric machine and a consumer.

FIG. 1 depicts, in a purely schematic view, a first embodiment of a system 1 with a cryogenic electric machine 100 having a rotor 110 and a stator 120. The system 1 may be installed in a vehicle such as a submarine or an electrically driven aircraft. In the operating state of the electric machine 100, the rotor 110 having magnetic components 111 rotates in relation to the stator 120, which has a stator winding system 121. Rotor 110 and stator 120 are arranged with respect to each other in such a manner that the magnetic components 111 and the stator winding system 121 enter into electromagnetic integration with each other in such a manner that, owing to the interaction, the electric machine 100 operates as a generator in a first operating mode and/or as an electric motor in a second operating mode. The manner of operation of the electric machine 100 is therefore based on the concept, which is known per se, that rotor 110 and stator 120 interact electromagnetically with each other, and therefore the electric machine 100 may operate in one of the two operating modes.

The starting point below by way of example is that the magnetic components 111 are realized by permanent magnets which generate a magnetic field which enters into the abovementioned electromagnetic interaction between rotor 110 and stator 120, which ultimately establishes the operation of the electric machine 100 as an electric motor or as a generator. For the sake of completeness, the magnetic components 111 may also be realized, for example, as a rotor winding system. However, statements of this type are known per se and are therefore not explained further in the following.

If the electric machine 100 operates as a generator, the rotor 110 and, with the latter, the magnetic components 111 are set into rotation, for example, via a shaft (not illustrated) of the electric machine 100, and therefore an electric voltage is induced in the stator winding system 121, which voltage may be tapped off for further use. If the electric machine 100 is intended to operate as an electric motor, the stator winding system 121 is acted upon with electric current, and therefore, because of the interaction of the magnetic fields, which are thereby generated, with the fields of the magnetic components 111, a torque acts on the rotor 110 and therefore on the shaft. This manner of action is also known per se and therefore will not be explained further.

In the first embodiment illustrated in FIG. 1, the magnetic components 111 of the rotor 110 or the permanent magnets 111 constitute a first cryogenic component of the electric machine 100. The permanent magnets 111 here are in particular superconductive permanent magnets or—at an appropriate temperature—are superconducting permanent magnets. The stator winding system 121 constitutes a further component of the electric machine 100, wherein, in contrast to the first cryogenic component 111, the further component 121 does not necessarily have to have cryogenic properties.

Therefore, while the embodiment of the first component 111 as a cryogenic component provides that it has superconducting properties at a corresponding ambient temperature, the starting point with the further component 121 is merely that, although it does not merge into the superconducting state, its electrical resistance, however, is reduced by a factor of an order of magnitude of, for example, 10-100 at correspondingly low temperatures. Advantageously, in order to achieve this effect, the temperatures do not have to be as low as for the superconducting component 111.

In addition to the electric machine 100, the system 1 has a consumer 200 to which an operating medium 10 is supplied. The consumer 200 may be an internal combustion engine or a turbine, wherein the operating medium is put into effect in the turbine 200 in that it is burned with the aim of providing kinetic energy. Alternatively, the consumer 200 may be a fuel cell in which the operating medium 10 is put into effect in a known manner in order to provide electrical energy. The consumer 200 may optionally include both a fuel cell and also an internal combustion engine, and the operating medium 10 is accordingly divided up according to requirements and conducted to the motor and/or to the fuel cell in order to be put into effect there.

The starting point below is that the consumer 200 is a hydrogen/oxygen fuel cell and the operating medium 10 is hydrogen. In the fuel cell 200, the operating medium 10 or the hydrogen 10 is brought in a manner known per se into contact with oxygen $O_2$ which may be removed, for example, from the environment. Hydrogen 10 and the reaction partner oxygen $O_2$ undergo a chemical reaction, from which electrical energy EEB and a reaction product $H_2O$ emerge. The electrical energy EEB may be supplied to electrical devices 400 of the system 1 or of the vehicle in which the system 1 is installed. Such an electric device 400 may be the electric machine 100, in particular, if the latter operates as an electric motor. It is also conceivable for the electric device 400 to be a battery where the electrical energy EEB may be stored for further use. The electric device 400 may also include diverse other electric consumers of the system 1 or of the vehicle. Deionized water $H_2O$ occurs as a further product of the fuel cell 200 or as a reaction product and may also be used for further use in the system 1 or in the vehicle, for example, for cooling or as service water or industrial water.

The operating medium 10 is stored in a liquid form and at the correspondingly necessary low temperature in a reservoir 20 of the system 1. The liquid state of the medium 10 is symbolized by wavy lines in FIG. 1. As explained in the introduction, the operating medium 10, before being put into effect in the consumer 200, is brought or heated to a temperature suitable for this purpose. In order to achieve this, the operating medium 10 is supplied from the reservoir 20, initially in the liquid form, to the electric machine 100 and is supplied there via a suitable conduction system 130 having a plurality of portions 131, 132, 133, in particular first of all to the first cryogenic component 111 where the operating medium is used as a liquid coolant because of its temperature. This results in corresponding cooling of the first component 111 to a temperature at which the first component 111 passes into the superconducting state. Suitable materials are, for example, in a first generation (Bi, Pb)$_2$Sr$_2$Ca$_2$Cu$_3$O$_x$ with a transition temperature of Tc=110K, in a second generation YBCO (yttrium-barium-copper oxide) with a transition temperature of approx. Tc=92K or else broadly formulated REBCO (RE=Rare Earth, e.g., rare earth material such as Gd, in combination with barium-copper oxide), wherein REBCO materials have a similar transition temperature Tc to YBCO. Commercially available HTS ribbon conductors of the first and second generation are superconducting at the temperature of the boiling hydrogen (in the case of "normal" magnetic fields). In particular, the vaporization enthalpy of the coolant 10 is used here, wherein the cooling capacity is advantageously available by definition isothermally, e.g., at a constant temperature. It is therefore provided that a constantly low temperature always prevails, and therefore the superconductive first component 111 is in the superconducting state. It is of course required here for the liquid operating medium or coolant 10 to be present at a correspondingly low temperature. This temperature arises from the boiling point of the respective cryogenic liquid at the prevailing pressure.

The first component 111 or the rotor 110 with permanent magnets 111 is cooled with a first cooling system 140 of the electric machine 100. The first cooling system 140 may be a coolant bath. The coolant 10 passes via the portion 131 of the conduction system 130 into the coolant bath 140, and the bath 140 is arranged and dimensioned in such a manner that the rotor 110 and, in particular, the permanent magnets 111 or the cryogenic first component 111 are at least partially located in the liquid coolant 10. At the latest as the rotor 110 is rotating, each region of the cryogenic first component 111 passes at least temporarily and repeatedly into the coolant 10 in the bath 140, and therefore the cryogenic component may be tempered in such a manner that it passes into the superconducting state or maintains the latter. The vaporization enthalpy of the cryogenic medium is used here for the cooling.

During the cooling of the first component 111, vaporization of the coolant 10 in the bath 140 occurs, and therefore the coolant is finally entirely or at least predominantly in a gaseous state. The gaseous state of the medium 10 is symbolized by dots in FIG. 1. For example, in the event that hydrogen is used as the operating medium or coolant 10, it may be assumed that the hydrogen 10 is present in the gas phase directly after the vaporization at a pressure-dependent temperature, (for example, at approx. 25K), at which it clearly still has a considerable cooling potential, (for example, for the further component 121 of the electric machine 100). The same is true of other cryogenic coolants, even if the boiling points thereof may differ from that of hydrogen and are sometimes higher. Nevertheless, the temperatures of coolants of this type after vaporization are still at such a low level that there is a significant cooling potential in the heating enthalpy.

The coolant 10 which is now present entirely or at least predominantly in a gaseous state is conducted via a further portion 132 of the conduction system 130 to a second cooling system 150 of the electric machine 100, which cooling system is provided to cool down the further component 121 or the stator winding system 121 of the electric machine 100, wherein use is made of at least a portion of the cooling capacity of the coolant 10 that remains after the cooling of the first component 111.

While, as already mentioned, the cooling of the first cryogenic component 111 is based on using the vaporization enthalpy of the liquid coolant 10 or on at least a portion thereof, the cooling down of the further component 121 is based on the use of at least a portion of the heating enthalpy of the coolant 10. However, for the cooling down of the further component 121, use may also be made of a residue of the vaporization enthalpy remaining after the cooling of the first cryogenic component 111 if the complete amount of cryogenic coolant 10 available has not already been vaporized during the cooling of the rotor.

The cooling concept or cooling down concept is therefore based on the fact that, firstly, in order to cool the cryogenic component 111, use is made of the vaporization enthalpy of the coolant 10 in order to keep the component 111 at a very substantially constant operating temperature and therefore to maintain the superconducting state, and that, secondly, use is additionally made of the fact that a considerable cooling potential is still contained in the heating enthalpy of the vaporized coolant 10, the cooling potential being used to cool down the further component 121.

There are several possibilities for cooling down the further component 121, e.g., for realizing the second cooling system 150. For example, the cold gas 10 may flow directly along the further component 121 to be cooled, or the second cooling system 150 may have a heat exchanger (not illustrated) with a further cooling circuit, which operates with a further fluidic coolant which ultimately interacts thermally with the further component 121. Alternatively, the second cooling system 150 may have components composed of thermally readily conducting materials which, on one side, are connected in thermal contact to the cold gas 10 and, on the other side, are connected directly to the component 121 to be cooled, and therefore the further component 121 is thermally coupled via heat conduction and may therefore be cooled down.

Within the scope of the cooling down of the further component 121, the latter is cooled down to an operating temperature which is reduced in relation to a normal temperature. This is intended to be expressed by the fact that the cooling down of the further component 121 proceeds to such an extent that not only is an operationally induced heating up of the further component 121 compensated for on account of those losses which arise during the regular operation of the further component 121 or that the corresponding heat is removed. Going beyond such simple cooling, the further component 121 is cooled down to a temperature level which lies below the normal temperature. The normal temperature may be understood here as meaning the same temperature which the further component 121 would have if the system 1 or the electric machine 100 were not in operation. For example, the normal temperature may be the ambient temperature or room temperature of the environment in which the electric machine 100 is located. For the definition of the normal temperature, it may also be assumed that the further component 121 will have a temperature lying above the normal temperature as soon as the electric machine 100 is operated.

Accordingly, the heating enthalpy and optionally a remaining portion of the vaporization enthalpy are used for cooling the further component 121. However, as just described, the intention is not only for the operationally induced losses of the further component 121 to be removed, but also the intention is to make use of the effect that the electrical resistance of the further component 121 decreases as the temperature drops and therefore so too does, for example, the $I^2 \cdot R$ losses. In this case, I is the electric current through the component 121 and R is the electrical resistance of the component 121. It should therefore be endeavored that the temperature of the further component 121 is also as low as possible. It may be assumed here that the coolant 10 brings about cooling down of the further component 121 to a lower temperature level below the normal temperature, and therefore the level of the operationally reduced losses is reduced once again, which, in turn, facilitates the cooling.

After passing through the second cooling system 150 and cooling down the further component 121, the coolant or operating medium 10 is conducted via a further portion 133 of the conduction system 130 in a furthermore gaseous state out of the electric machine 100 and to the consumer 200. Depending on the design of the consumer 200 as a fuel cell, turbine, etc., the operating medium 10 is put into effect or processed by the consumer 200, as already explained. In an advantageous manner, the operating medium 10 on reaching the consumer 200 is at a temperature suitable for operating the consumer 200.

The coolant 10 is only removed from the electric machine 100 and, in particular, from the second cooling system 150 when the temperature of the coolant 10 exceeds a first predetermined minimum value. Alternatively, the temperature of the further component 121 may also be monitored. The first minimum value may be predetermined, for example, on the basis of the sought-after operating temperature of the further component 121. The first minimum value may therefore be predetermined in such a manner that it may be provided that the further component 121 is operated below the normal temperature. An additional or alternative condition for removing the coolant 10 from the electric machine consists in that the coolant 10 is only supplied as operating medium 10 to the consumer 200 when a temperature of the coolant 10 has exceeded a second predetermined minimum value. The second minimum value may be oriented to the optimum operating conditions of the consumer 200. The current temperature of the coolant 10 may be determined, for example, by a temperature sensor 151 of the second cooling system 150.

Although the first and second minimum value may be identical, the first minimum value may be predetermined in such a manner that the coolant 10 is removed as soon as its temperature is so high, and therefore its cooling effect is so low, that further cooling down of the further component 121 is no longer provided. The second minimum value will ideally be so high that the temperature of the coolant 10 or of the operating medium 10 for the consumer 200 lies in the optimum range for the operation of the consumer 200.

Purely by way of example, one conceivable application for a system 1, which is installed in an electrically or hybrid-electrically driven aircraft, is described below. The system 1 onboard the aircraft is intended to have an electric machine 100 which operates as a generator and has a rotor 110 with superconductive permanent magnets 111 and with a stator 120 with a stator winding system 121 and also a fuel cell 200. It may be assumed that, in order to generate electrical energy, the fuel cell 200 is used at an electrical capacity of 200 kW. The fuel cell 200 is supplied with fuel or operating medium 10 from the reservoir 20 containing liquid hydrogen 10. From the hydrogen throughput necessary for this purpose, a vaporization capacity of approx. 1.9 kW is calculated at the boiling point of the hydrogen 10. In addition, approx. 12 kW of refrigerating capacity is still available and will be available when the coolant or operating medium 10 is heated to room temperature. In order to cool the rotor 110 or the permanent magnets 111, use is made of a portion of the mentioned vaporization capacity, e.g., the vaporization enthalpy. The remaining cooling capacity from the vaporization, e.g., the possibly present remainder of the vaporization enthalpy, and also in particular the heating enthalpy may now be used for cooling the stator 120 or the stator winding system 121. For overall losses during the operation of the electric machine 100, according to current estimations approx. 200 kW are presumed, which may be substantially attributed to the ohmic losses of the stator 120 and of the winding system 121. If the vaporization cooling capacity possibly still remaining after the cooling of the rotor 110 and the permanent magnets 111 and the heating enthalpy are now used in order to cool the stator winding system 121 to a temperature of, for example, approx. 60K and ideally also to keep it there, the resistance of the copper qualities used for a stator winding 121 drops by more than a factor of 20 in relation to the resistance at the otherwise customary stator operating temperature of up to 150° C. The $I^2 \cdot R$ losses therefore decrease by the same factor and thus go back to approx. 10 kW. This may be covered by the available cryogenic cooling capacity. This calculation may be understood as being purely by way of example. Specific values may differ therefrom.

If even lower temperatures are sought, by the use of highly pure copper qualities, for example, for the stator winding 121, the ohmic resistance thereof may be reduced further. However, as the stator temperature drops, the portion of the heating enthalpy of the coolant 10 that is usable for cooling the stator also drops.

In particular, but not exclusively, in the specific use of the system 1 in an aircraft, it has proven advantageous if at least the further component 121 is cooled down before the electric machine 100 is put into operation, in particular, before the starting of the aircraft. The effect therefore achieved is that the temperature of the further component 121 is already as low as possible at the time of starting the electric aircraft and in particular lies below the normal temperature, and therefore an overloading of the electric machine 100, for example for starting the aircraft, is briefly made possible. In this example, the putting of the electric machine 100 into operation is associated with the activation of a drive system of the aircraft in order to generate thrust.

Although "a rotor winding" and "a stator winding" or corresponding winding systems are discussed above, this should not be understood to be so restrictive that rotor and stator actually in each case only have a single such winding. Of course, rotor and/or stator may each include a plurality of such windings.

The supply and removal of the coolant or operating medium 10 from and to various components and component parts 20, 100, 110, 120, 140, 150, 200 of the system 1 is realized by a control unit 300, and may be realized on the basis of temperatures prevailing at various locations of the system 1. For this purpose, use is made of sensors 141, 151 which are arranged, for example, in the first cooling system 140 and second cooling system 150 in order to determine the temperatures prevailing there. Furthermore, sensors 112, 122 may be provided which measure the temperatures of the components 111, 121 and transmit same to the control unit 300. Depending on the diverse temperatures, the control unit 300 influences the flow of the coolant or operating medium 10, for example with the aid of pumps and/or valves (not illustrated). For this purpose, for example, the first and second minimum values introduced above may be stored in the control unit 300.

Figure 2:
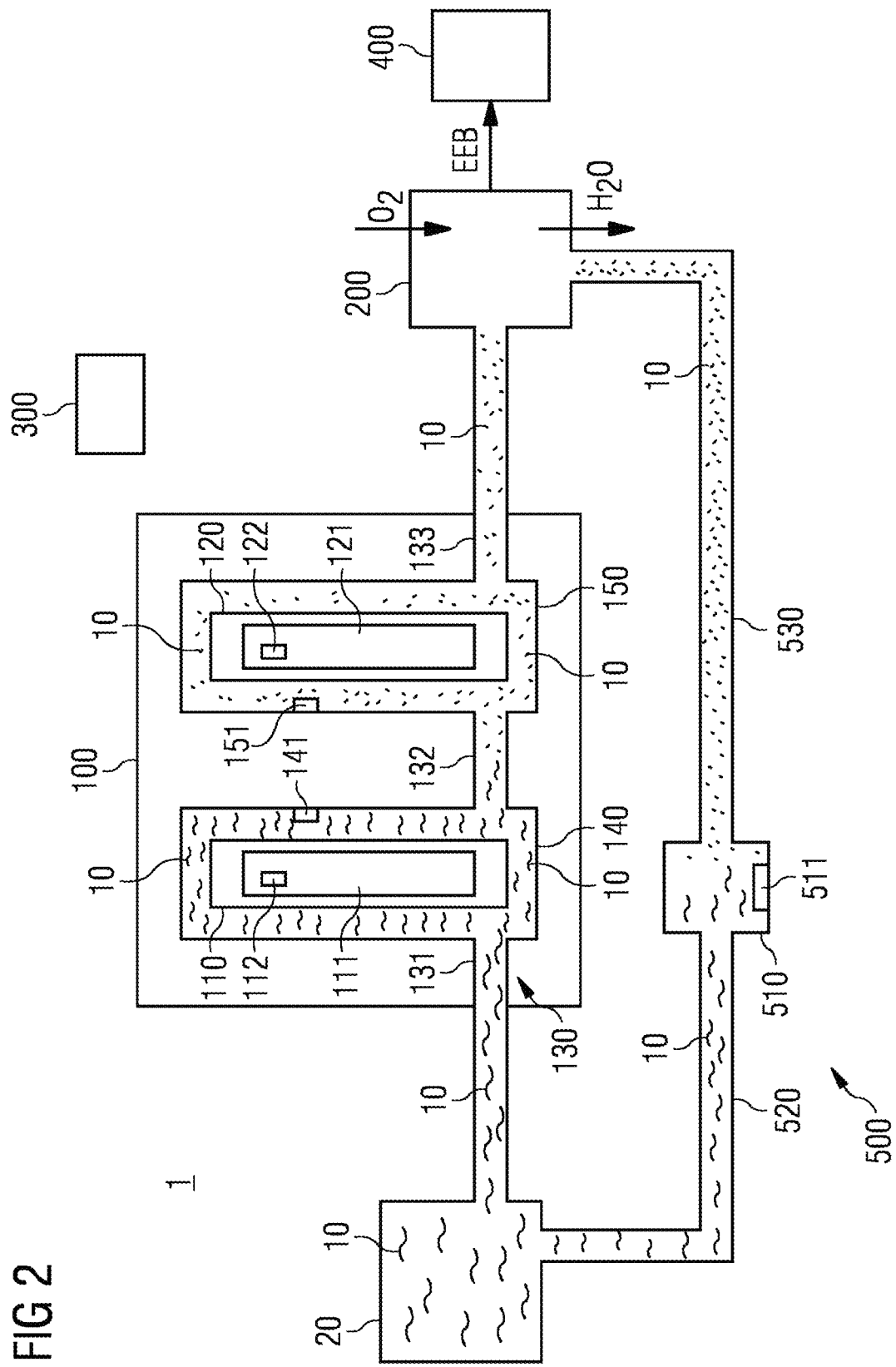
FIG. 2 depicts a first variant of a second embodiment of the system.

During operation of the system 1, a temporally varying capacity requirement arises at the fuel cell 200, and therefore the requirement of the fuel cell 200 for operating medium 10 also varies. In accordance with the requirement of the fuel cell 200, the available refrigerating capacity of the coolant 10 from the second cooling system 150 will consequently vary, which, depending on the level of the electrical losses in the stator 120, leads to temperature changes in the stator 120 because the coolant 10 is optionally withdrawn at an early point from the second cooling system 150 in order to cover the increased requirement of the fuel cell 200. Because, however, the stator 120 has a comparatively large heat capacity because of its structure, temporally occurring differences between available refrigerating capacity and refrigerating capacity required in the stator 120 may be buffered to a certain extent in the large heat capacity of the stator winding 121. FIG. 2 depicts a first variant of a second embodiment of the system 1. In this variant, account is taken in particular of the situation that rotor 110 and stator 120 may have a different cooling requirement at any time. In particular, for the reasons mentioned further above, the rotor 110 may always be kept at a virtually constant cryogenic temperature, which leads to the fact that the vaporization rate which may be achieved by the rotor 110 is substantially fixed, e.g., that the amount of gaseous coolant or operating medium 10 that may be provided by the rotor 110 and may be supplied to the second cooling system 150 per unit of time is substantially constant. Depending on the current loading of the fuel cell 200, this may, however, possibly require a volumetric flow of operating medium 10 that goes beyond the constant flow of coolant 10 that is provided by the rotor 110 and depends on the vaporization rate at the rotor 110. In order to provide a sufficient supply of the fuel cell 200 with operating medium 10 in such a situation, in the second embodiment a bypass 500 is provided with a heating device 510 which may be integrated in the electric machine 100, but which is illustrated separately in FIG. 2. From the reservoir 20, an additional line 520 leads to the heating device 510, via which line the liquid coolant or operating medium 10 may be transported out of the reservoir 20 to the heating device 510. The heating device 510 heats the coolant or operating medium 10 to such an extent that the latter is at the temperature suitable for use in the fuel cell 200. The coolant or operating medium 10 which is heated up in this manner and is now gaseous is guided via a line 530 to the fuel cell 200 in order to be put into effect there as described above.

The heating in the heating device 510 may take place, for example, by an electric heater 511. Alternatively to the electric heater 511, the heating device 510, (in particular, if it is integrated in the electric machine 100), may use heat from the stator 120 in order to heat the coolant or operating medium 10. For this purpose, the heating device 510 is arranged in the machine 100 in such a manner that it is in thermal contact with the stator 120, and therefore heat may transfer from the stator to the heating device 510.

The described bypass 500 constitutes a mechanism of circumventing in particular the rotor 110, via which the circumventing coolant or operating medium 10 may be supplied directly to the fuel cell 200 in order to reach an independency of the system 1 from the constant vaporization rate of the rotor 110, and therefore it is possible, for example, to react to current variations in the requirement of the fuel cell 200 for operating medium 10.

Figure 3:
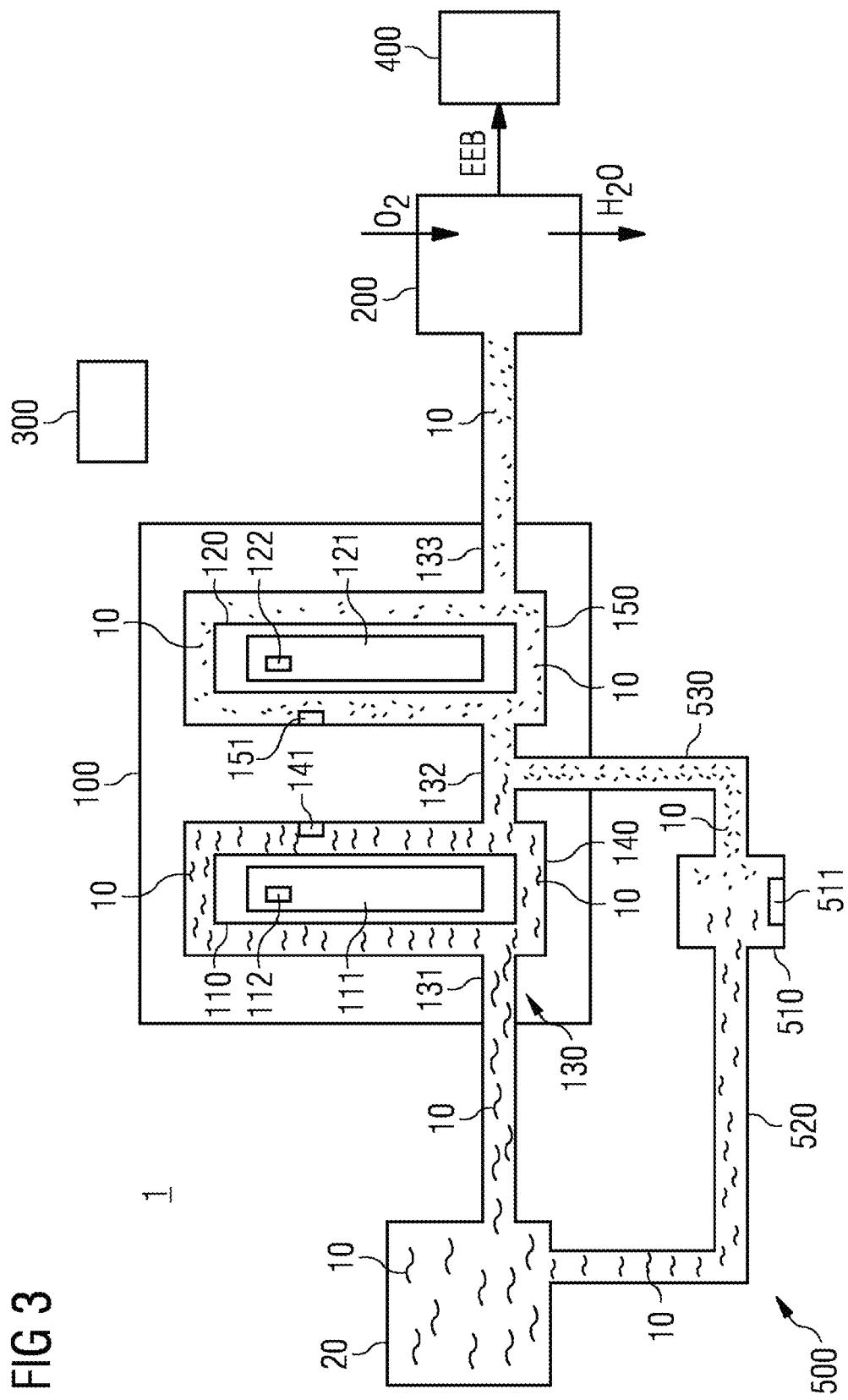
FIG. 3 depicts a second variant of the second embodiment of the system.

In a second variant of the second embodiment that is illustrated in FIG. 3, the line 530 is not connected directly to the fuel cell 200, but rather to the line portion 132 or directly to the second cooling system 150. In this configuration, the second cooling system 150 may use the refrigerating line, which may still be available in the coolant or operating medium 10 after heating in the heating device 510, for cooling the stator 120.

Figure 4:
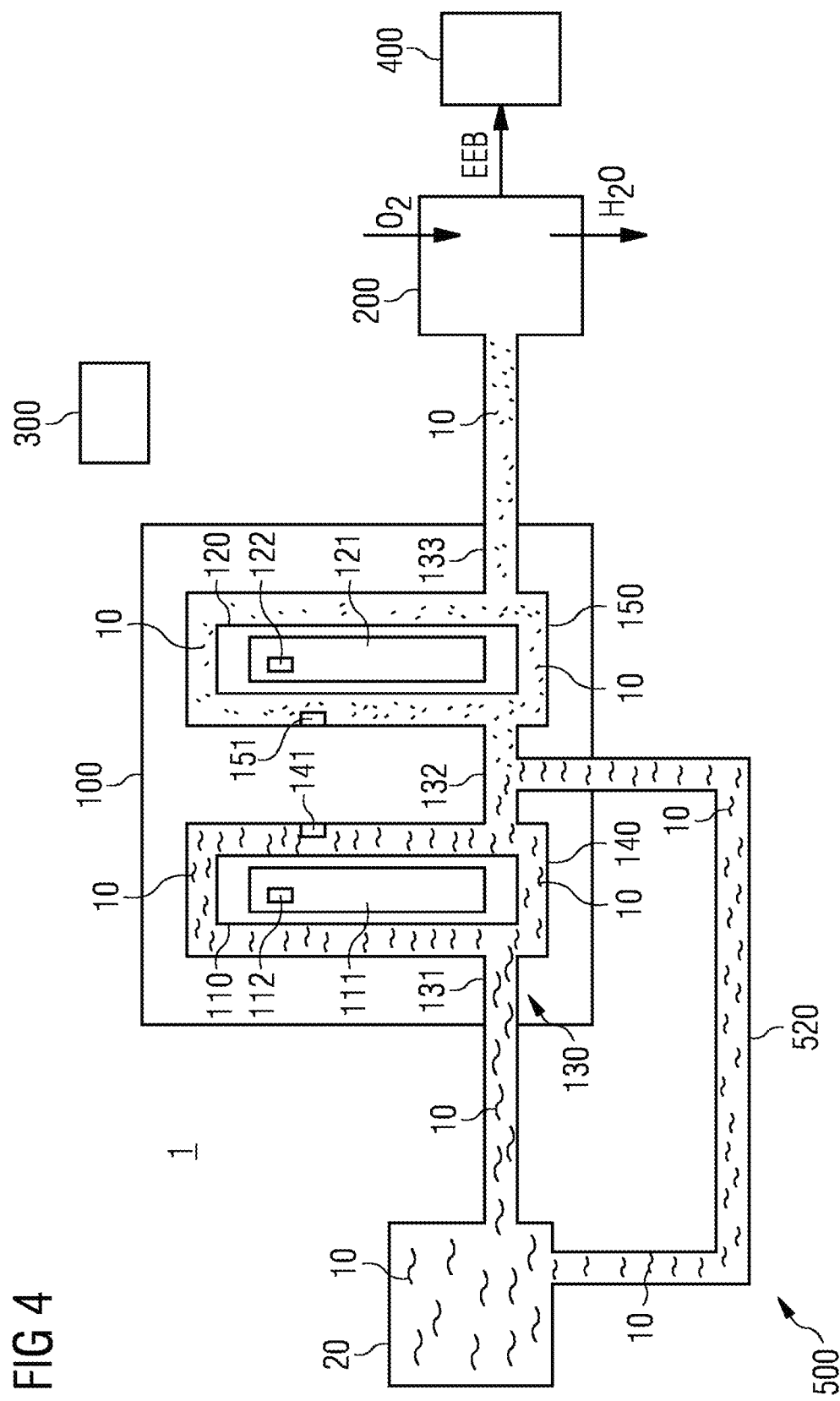
FIG. 4 depicts a third variant of the second embodiment of the system.

A third variant of the second embodiment that is illustrated in FIG. 4 is based on the fact that the coolant or operating medium 10 may be brought solely in the second cooling system 150 to a temperature which is suitable for use in the fuel cell 200. Accordingly, the bypass 500 merely has the line 520 while the separate heating device 510 and consequently the line 530 are omitted. The coolant or operating medium 10 is supplied, as in the second variant, to the line portion 132 or directly to the second cooling system 150. In this variant, the second cooling system 150 or the stator 120 therefore takes on the function of the heating device 510, e.g., in this variant, a heating element is also formally present, namely the stator 120 or the stator winding 121.

The system described in the second embodiment is constructed on the fact that, firstly, the rotor 110, as described, has a fixed vaporization rate while, secondly, the requirement of the fuel cell 200 for operating medium 10 may vary. The stator 120, by contrast, is a flexible component which does not have a specific requirement for coolant or operating medium 10 and which may also be operated without a minimum supply. The sole consideration for the stator 120 is that as low a temperature as possible is advantageous, but that temporary higher temperatures may be compensated for or are acceptable. Accordingly, the variants of the second embodiment use the bypass 500 which fluidically circumvents the rotor 110 and provides the coolant or operating medium 10, depending on variant, at various points and with or without a preliminary vaporizer 510, and therefore a possibly greater requirement of the fuel cell 200 for operating medium 10 may be satisfied.

In a third embodiment, which is illustrated in FIG. 5 and addresses the same problem as the second embodiment, a store 160 for coolant or operating medium 10 is provided between rotor 110 and stator 120. The store 160 may alternatively also be arranged between stator 120 and fuel cell 200, which has the advantage that the coolant or operating medium 10 which is temporarily stored in the store 160 already has a higher temperature which is close to the temperature of the operating medium 10 that is suitable for the fuel cell 200. This alternative is illustrated in FIG. 3 by dashed lines. In the event that the fuel cell 200 requires less operating medium 10 than is provided by the rotor 110, the excess operating medium 10 may be temporarily stored in the store 160. As soon as the requirement of the fuel cell 200 for operating medium 10 exceeds the amount provided by the rotor 110, temporarily stored operating medium may be retrieved from the store 160.

The second and the third embodiments may be combined with each other. For example, a corresponding system 1 would have both the preliminary vaporizer 500 with the corresponding lines 510, 520, and also the store 160. The control and regulation of the system including the flows of coolant or operating medium 10 is carried out by the controller 300 in all of the embodiments.

As already mentioned, as an alternative to the design as a superconductive permanent magnet, the first cryogenic component 111 of the machine 100 may also be designed as a superconductive rotor winding system. It is also conceivable that the first cryogenic component 111 is not a component part of the rotor 110, but rather of the stator 120. In this case, for example, the stator winding 121 would represent the first cryogenic component while the further component is realized by the permanent magnets 111 or else by the rotor winding system mentioned.

In the embodiment described above, the cryogenic component part of the system 1 was a cryogenic electric machine 100, in particular the rotor 110 thereof or the rotor winding 111 of the latter. However, the corresponding concept may also be used, for example, for a transformer or a current limiter, etc.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for operating a system comprising a cryogenic electric machine having a multiplicity of components and a conduction system, a consumer, a reservoir, and a bypass fluidically connecting the reservoir and the consumer, wherein the multiplicity of components of the cryogenic electric machine comprise a cryogenic component, a first cooling system assigned to the cryogenic component, a further component, and a second cooling system assigned to the further component, and wherein the bypass comprises a heating device, the method comprising:

storing a coolant in the reservoir in a liquid state;
supplying a first portion of the coolant from the reservoir in the liquid state to the first cooling system and to the cryogenic component of the cryogenic electric machine via a first portion of the conduction system in order to cool the cryogenic component to a cryogenic temperature using at least a portion of a vaporization enthalpy of the coolant, wherein at least a portion of the coolant vaporizes, and wherein the reservoir is fluidically or thermally connected to the cryogenic electric machine;
subsequently supplying, by the first cooling system via a further portion of the conduction system, the first portion of the coolant in a liquid state, a gaseous state, or a liquid and gaseous state to the second cooling system and to the further component of the cryogenic electric machine in order to cool down the further component to an operating temperature which is reduced in relation to ambient temperature, using a remaining cooling capacity of the coolant and using at least a portion of a heating enthalpy of the coolant;
circumventing, with a second portion of the coolant from the reservoir in the liquid state, the cryogenic component in the first cooling system via the bypass fluidically connecting the reservoir and the consumer, wherein the second portion of the coolant is heated and converted into a gaseous state within the bypass via the heating device of the bypass; and
subsequently providing the first portion of the coolant from the cryogenic electric machine and the second portion of the coolant from the reservoir to a consumer, wherein the first and second portions of the coolant are configured to be used by the consumer as an operating medium, and wherein the first and second portions of the coolant are provided to the consumer in a gaseous state.

2. The method of claim 1, further comprising:
supplying excess coolant vaporized in the cryogenic component to a store; and
temporarily storing the excess coolant in the store; and
supplying at least a portion of the excess coolant from the store to the consumer as an additional operating medium when a requirement of the consumer for operating medium exceeds an amount of the operating medium provided by the cryogenic electric machine.

3. The method of claim 1, wherein the cryogenic electric machine is a superconductive electric machine.

4. A system comprising:
a cryogenic electric machine having a multiplicity of components and a conduction system for conducting a coolant to and between the components; and
a consumer configured to put an operating medium into effect,
wherein the multiplicity of components of the cryogenic electric machine comprise:
a cryogenic component;
a first cooling system assigned to the cryogenic component and to which the coolant is configured to be supplied in a liquid state via a first portion of the conduction system to cool the cryogenic component, using at least a portion of a vaporization enthalpy of the coolant, to a cryogenic temperature;
a further component; and
a second cooling system assigned to the further component and to which the coolant is configured to be supplied by the first cooling system via a further portion of the conduction system to cool down the further component, using a remaining cooling capacity of the coolant and using at least a portion of a heating enthalpy of the coolant, to an operating temperature which is reduced in relation to ambient temperature;
a reservoir configured to store and provide the coolant in a liquid state, wherein the reservoir is fluidically or thermally connected to the cryogenic electric machine in such a manner that the coolant is configured to be supplied to the first portion of the conduction system and, via the first portion, to the cryogenic component; and
a bypass fluidically connecting the reservoir and the consumer such that a portion of the coolant in the liquid state circumvents the cryogenic component in the first cooling system, wherein the bypass has a heating device with which the portion of the coolant supplied to the bypass in the liquid state is configured to be heated and converted into a gaseous state,
wherein the operating medium of the consumer is the coolant, and
wherein the consumer and the cryogenic electric machine are fluidically connected to each other in such a manner that the coolant, after passing through the second cooling system of the cryogenic electric machine, is configured to be supplied to the consumer in a gaseous state.

5. The system of claim 4, wherein the cryogenic component is a rotor of the cryogenic electric machine.

6. The system of claim 5, wherein the rotor is cooled in or at a bath having the coolant.

7. The system of claim 6, wherein, via rotation of the rotor, each region of the rotor is cooled by passing repeatedly into the bath having the coolant.

8. The system of claim 5, wherein the rotor is a cryogenic rotor winding or a superconducting permanent magnet.

9. The system of claim 4, wherein the further component is a normally conducting component.

10. The system of claim 4, wherein the further component is a stator of the cryogenic electric machine.

11. The system of claim 10, wherein the stator is a stator winding.

12. The system of claim 4, wherein the bypass fluidically connects the reservoir and the consumer such that the further component and the second cooling system are circumvented.

13. The system of claim 4, further comprising:
a store configured to at least temporarily store excess coolant vaporized in the cryogenic component.

14. The system of claim 4, wherein the cryogenic electric machine is a superconductive electric machine.

15. The system of claim 4, wherein the consumer is a turbine or an internal combustion engine.

16. A system comprising:
a cryogenic electric machine having a multiplicity of components and a conduction system for conducting a coolant to and between the components; and
a consumer configured to put an operating medium into effect,
wherein the multiplicity of components of the cryogenic electric machine comprise:
a rotor;
a first cooling system assigned to the rotor and to which the coolant is configured to be supplied in a liquid state via a first portion of the conduction system to cool the rotor, using at least a portion of a vaporization enthalpy of the coolant, to a cryogenic temperature;
a stator; and
a second cooling system assigned to the stator and to which the coolant is configured to be supplied by the first cooling system via a further portion of the conduction system to cool down the stator, using a remaining cooling capacity of the coolant and using at least a portion of a heating enthalpy of the coolant, to an operating temperature which is reduced in relation to ambient temperature;
a reservoir configured to store and provide the coolant in a liquid state, wherein the reservoir is fluidically or thermally connected to the cryogenic electric machine in such a manner that the coolant is configured to be supplied to the first portion of the conduction system and, via the first portion, to the rotor; and
a bypass fluidically connecting the reservoir and the second cooling system for cooling the stator, wherein the bypass circumvents the first cooling system,
wherein the operating medium of the consumer is the coolant,
wherein the consumer and the cryogenic electric machine are connected to each other in such a manner that the coolant, after passing through the second cooling system of the cryogenic electric machine, is configured to be supplied to the consumer in a gaseous state.

17. The system of claim 16, wherein the bypass has a heating device with which the coolant supplied to the bypass in the liquid state is configured to be heated into a gaseous state, and
wherein the heating device is a separate device of the bypass for heating the coolant.

* * * * *